United States Patent [19]

Kageyama et al.

[11] Patent Number: 5,223,927
[45] Date of Patent: Jun. 29, 1993

[54] IMAGE SIGNAL AVERAGE PICTURE LEVEL DETECTING APPARATUS

[75] Inventors: Atsuhisa Kageyama, Ibaraki; Hideaki Sadamatsu, Hirakata, both of Japan

[73] Assignee: Matsushita Electric Industrial Co., Ltd., Osaka, Japan

[21] Appl. No.: 728,245

[22] Filed: Jul. 10, 1991

[30] Foreign Application Priority Data

Jul. 19, 1990 [JP] Japan .................. 2-189471

[51] Int. Cl.⁵ .............. H04N 9/27; H04N 5/235; H04N 5/57; H04N 5/18
[52] U.S. Cl. .................... 358/139; 358/39; 358/168; 358/172; 307/494
[58] Field of Search .......... 358/160, 21 R, 39, 139, 358/10, 168, 170, 171, 172, 173, 27, 34, 169; 307/491, 358, 494

[56] References Cited

U.S. PATENT DOCUMENTS

| | | | |
|---|---|---|---|
| 3,569,620 | 3/1974 | Baun | 358/170 |
| 4,338,527 | 7/1982 | Nagano | 307/494 |
| 4,340,904 | 7/1982 | Wingrove, Jr. | 358/29 |
| 4,543,614 | 9/1985 | Chen | 358/193.1 |
| 4,691,235 | 9/1987 | Okui et al. | 358/172 |
| 5,162,902 | 11/1992 | Bell et al. | 358/168 |

FOREIGN PATENT DOCUMENTS 49023 6/1966 Fed. Rep. of Germany .
1451830 10/1976 United Kingdom .

Primary Examiner—James J. Groody
Assistant Examiner—Safet Metjahic
Attorney, Agent, or Firm—Wenderoth, Lind & Ponack

[57] ABSTRACT

The average picture level (APL) of a video luminance signal is detected, wherein the output of a first current mirror circuit used as the load of a differential amplifying circuit is fed into a smoothing circuit via a second current mirror circuit. The direct current voltage of the output and the detection voltage amplitude may be optionally set without causing an offset voltage in the output average picture level voltage, with the current flowing through the second current mirror circuit being made zero at the time of APL=0%.

3 Claims, 6 Drawing Sheets

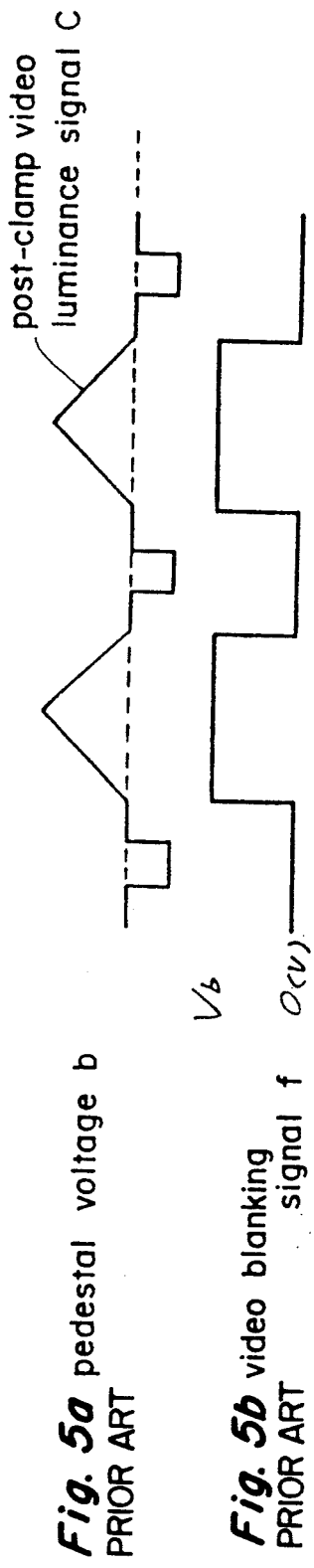
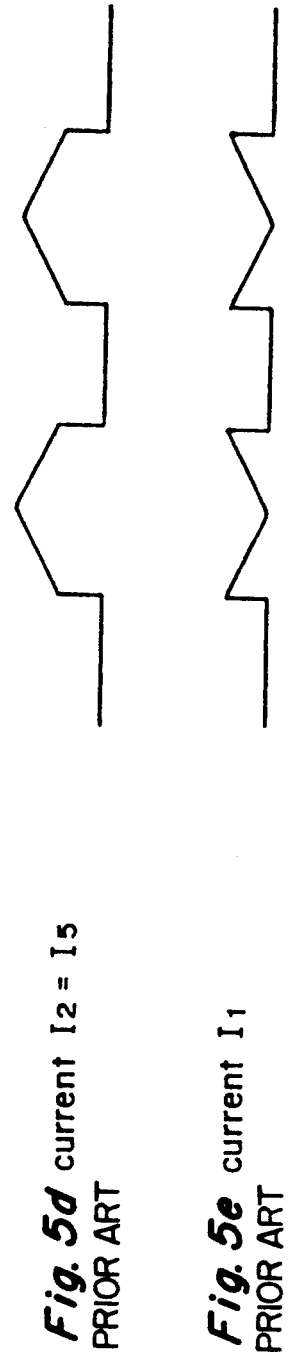
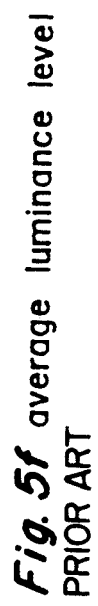
*Fig. 5a* pedestal voltage b
PRIOR ART
*Fig. 5b* video blanking signal f
PRIOR ART
*Fig. 5c* current I
PRIOR ART
*Fig. 5d* current $I_2 = I_5$
PRIOR ART
*Fig. 5e* current $I_1$
PRIOR ART
*Fig. 5f* average luminance level
PRIOR ART

IMAGE SIGNAL AVERAGE PICTURE LEVEL DETECTING APPARATUS

BACKGROUND OF THE INVENTION

The present invention generally relates to an image signal average picture level detecting apparatus which may be used in the detection of the average picture level (hereinafter referred to as APL) of image signals, such detection being necessary in a case where, for example, gradation correcting of video luminance signals is effected in image appliances such as television image receivers, video tape recorders and so on.

As color television image receivers have become larger in recent years, various gradation correcting apparatuses have been used to correct the gradation of image signals for the purpose of displaying the images more clearly and expanding the dynamic range of the images on the CRT. In order for the gradation correcting apparatus to effect the gradation correcting operation, it is necessary to detect the average picture level of the image signals. Therefore, the performance of the image signal average picture level detecting apparatuses has become more important.

The conventional image signal average picture level detecting apparatus will be described hereinafter with reference to FIGS. 4–6.

FIG. 4 shows a block diagram of the conventional image signal average picture level detecting apparatus. In FIG. 4, reference numeral 1 is a pedestal clamping circuit for clamping the pedestal of the input video luminance signal "a" to a pedestal voltage "b" (FIG. 5a). Reference numeral 2 is a synchronous separating circuit for separating a synchronous signal "e" from the input video luminance signal "a". Reference numeral 3 is a video blanking signal generating circuit for waveform shaping the synchronous signal "e" so as to generate a video blanking signal "f" (FIG. 5b). Reference characters Tr3 and R0 constitute a constant current supply 4 for generating a current I (FIG. 5c) when the video blanking signal "f" is in an image period. The current I is not generated when the video blanking signal "f" is in an image blanking period. The constant power supplies Tr1, Tr2, Ri, R8 constitute a differential amplifying circuit 5 for comparing the pedestal voltage "b" with a post-clamp video luminance signal "c" so as to generate currents I1 (FIG. 5c) and I2 (FIG. 5d) into the collectors of the respective transistors. As the amplitude of the video luminance signal becomes larger, the current I2 increases, and the current I1 decreases proportionately. The constant power supplies Tr7, Tr8, R6, R7 constitute a current mirror circuit 9, and the current I5 (FIG. 5d) equal to the current I2 which changes in accordance with the amplitude of the video signal is generated into the collector of Tr8. The constant power supplies $R_L$, $C_L$ and $V_P$ convert the current I5 into a voltage and average them so as to constitute a smoothing circuit 8 for generating an average picture level "d" (FIG. 5f).

The operation of the conventional image signal average picture level detecting apparatus will be described hereinafter.

The input video luminance signal "a" is inputted into a synchronous separating circuit 2 to obtain a synchronous signal "e". The synchronous signal "e" is inputted into a video blanking signal generating circuit 3 where it is waveform shaped to obtain the video blanking signal "f". The video blanking signal "f" is assumed to become approximately 0 volts during a blanking period as shown in FIG. 5(b), and to become a fixed voltage Vb during an image period. The signal "f" is inputted into the base of Tr3. The constant current I which becomes $$I = (Vb - V_{BE}) / Ro \qquad (1)$$

flows into the collector of Tr3 during the image period. $V_{BE}$ is the base emitter voltage of the transistor with any transistor being adapted to take approximately the same value. In the image blanking period, the base voltage of Tr3 is approximately 0 volts, so that Tr3 becomes cut off, thus resulting in I=0.

The input video luminance signal "a" is also inputted into the pedestal clamping circuit 1 to obtain the pedestal voltage "b" and the post-clamp video luminance signal "c". Namely, the pedestal level of the signal "c" becomes equal to the pedestal voltage "b". The pedestal voltage "b" and the post-clamp video luminance signal "c" are respectively inputted into the bases of Tr1 and Tr2. Since the transistors form the differential amplifying circuit 5, two relation formulas $$I = I1 = I2 \qquad (2)$$

$$V_{B1} - V_{B2} = R1 \cdot I1 - R8 \cdot I2 \qquad (3)$$

are approximately established, where R1=R8, with the base voltage of Tr1 being $V_{B1}$, and the base voltage of Tr2 being $V_{B2}$. For example, in a case of APL=0%, the following formula holds, $$I1 = I2 = I/2 \qquad (4)$$

The current I2 is inputted into the collector of Tr7 of the current mirror circuit 9 to obtain a corresponding current I5 flowing into the collector of Tr8. Namely, $$I2 = I5 \qquad (5)$$

The current I5 is generated in accordance with the image picture level, is converted into a voltage by $R_L$ and $C_L$, is simultaneously averaged, and is outputted as the average picture level "d" (FIG. 5f).

Assuming that the output average picture level voltage "d" at this time is $V_{APL}$, then, $$V_{APL} = V_P + R_L \int I5 \, dt \qquad (6)$$

Substituting the formulas (3) and (5) into the formula (6) and, assuming that R1=R8=R, then, $$V_{APL} = V_P + R_L/2R \times \int (V_{B2} - V_{B1}) \, dt + R_L \int I/2 \qquad (7)$$

It is found that the average value of the image signal is obtained in a second term as intended. The relationship between the input picture level $(V_{B2} - V_{B1})$ and $V_{APL}$ is shown in FIG. 6.

In the construction described hereinabove, an offset voltage of $R_L \cdot I/2$ is caused in the third term of the formula (7) representing the output average picture level "d". The average picture level voltage in the condition APL=0%, which becomes a reference of the operation of the circuit, changes according to $R_L$ and the current I of the constant current supply as shown in FIG. 6. Also, when an attempt is made to vary the output amplitude by an increase or decrease in the value of $R_L$, a problem arises in that the output voltage in the condition of APL=0% is also changed at the same time.

SUMMARY OF THE INVENTION

Accordingly, the present invention has been developed with a view to substantially eliminating the above discussed drawbacks inherent in the prior art and has for its essential object to provide an improved image signal average picture level detecting apparatus which is capable of optional selection of the output voltage when the average picture level of the image signal is zero (APL=0%).

Another important object of the present invention is to provide an improved image signal average picture level detecting apparatus of the type referred to above, which is capable of optionally setting the output amplitude without moving of the zero point in the average picture level.

In accomplishing these and other objects, according to one preferred embodiment of the present invention, there is provided an image signal average picture level detecting apparatus which is provided with a first current mirror circuit and a second current mirror circuit instead of the single current mirror circuit of the conventional construction.

The present invention uses the first current mirror circuit as a load (active load) of the differential amplifying circuit so as to supply the output thereof into the smoothing circuit using the second current mirror circuit. The present invention makes the current, which flows through the second current mirror circuit, zero at the time of APL=0% so that the direct current voltage of the output and the detection voltage amplitude may be optionally set without causing an offset voltage in the output average picture level voltage.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 5a through 5f constitute a performance waveform chart thereof; and

DETAILED DESCRIPTION OF THE INVENTION

Figure 1:
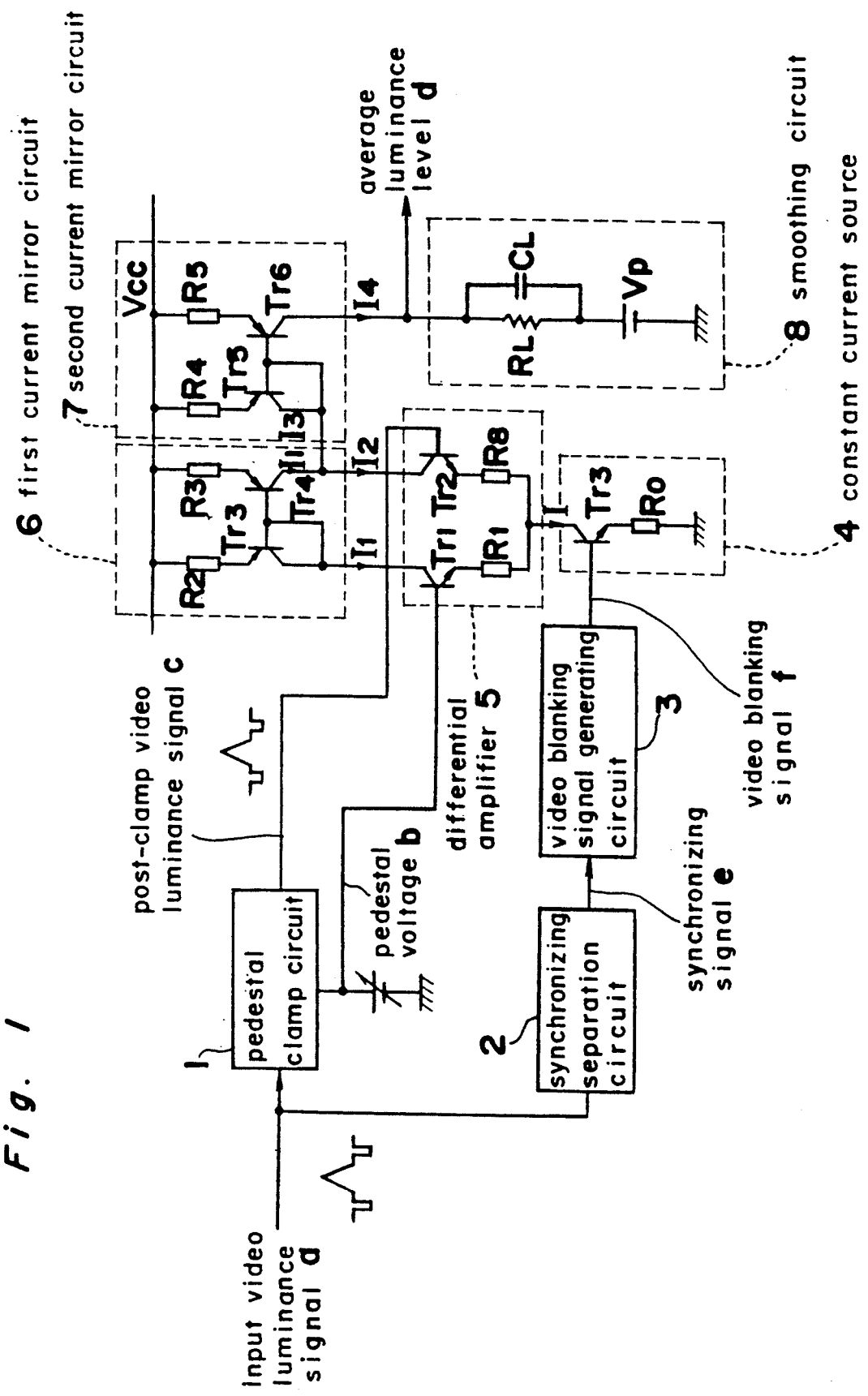
FIG. 1 is a block diagram of an image signal average picture level detecting apparatus in one embodiment of the present invention.

Before the description of the present invention proceeds, it is to be noted that like parts are designated by like reference numerals throughout the accompanying drawings.

Referring now to the drawings, there is shown in FIG. 1, an image signal average picture level detecting apparatus according to one preferred embodiment of the present invention. In FIG. 1, Tr3, Tr4, R2 and R3 constitute a first current mirror circuit 6 which is connected as a load (commonly referred to as an active load) to the differential amplifying circuit 5 formed by Tr1, Tr2, R1 and R8. The circuit 6 functions to cause a current I1, corresponding to the collector current I1 of Tr3 to flow into the collector of Tr4, where R2=R3. Tr5, Tr6, R4 and R5 constitute a second current mirror circuit 7. A current I4 corresponding to the difference between the collector current I1' of Tr4 and the collector current I2 of Tr2 flows into the collector of Tr6, with the collector of Tr5 being connected with the collector of Tr4. As the remaining construction is the same as the already described conventional embodiment, a description thereof is omitted below.

Figure 2:
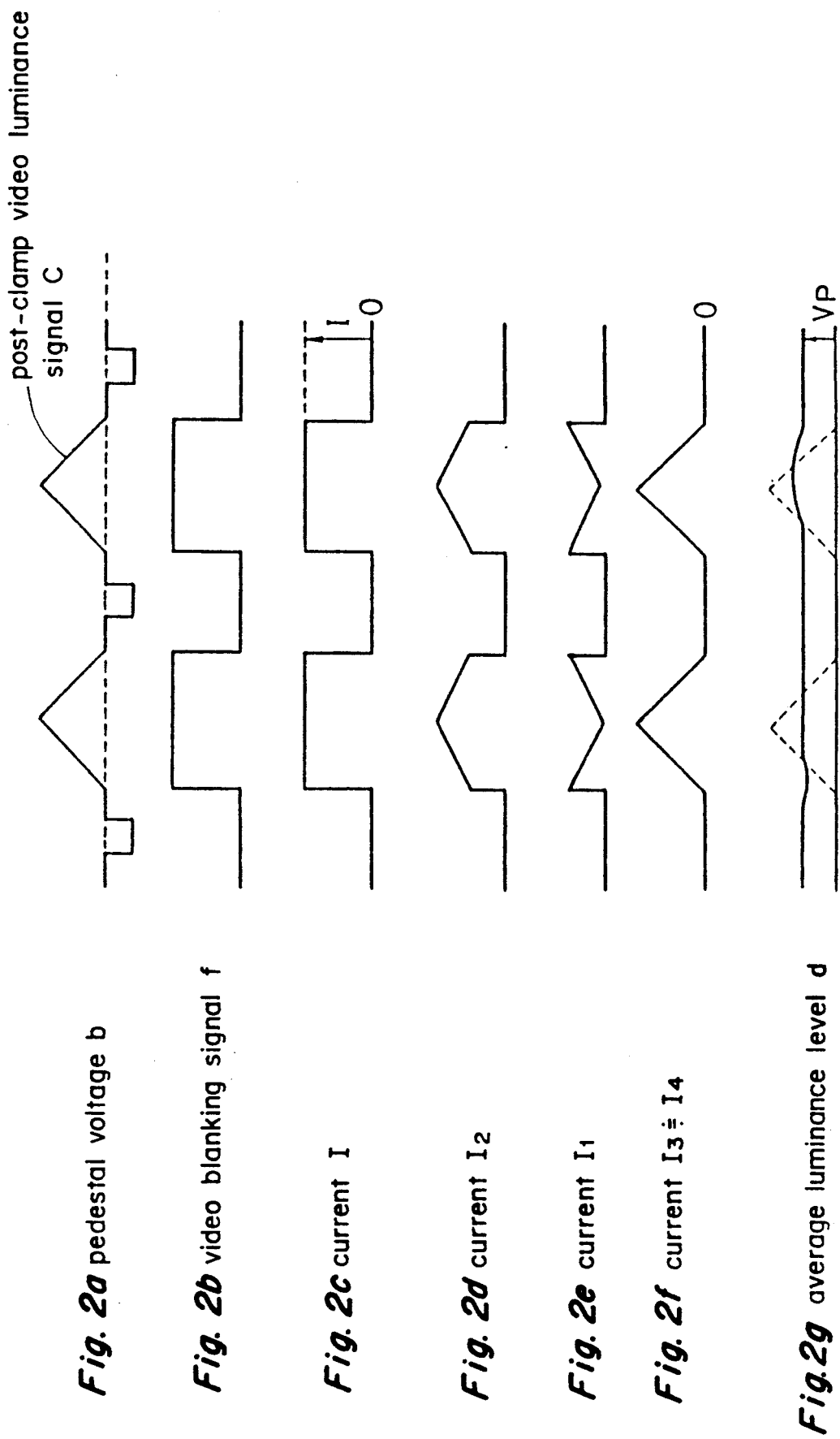
FIGS. 2a through 2g constitute a performance waveform chart thereof.
Figure 3:
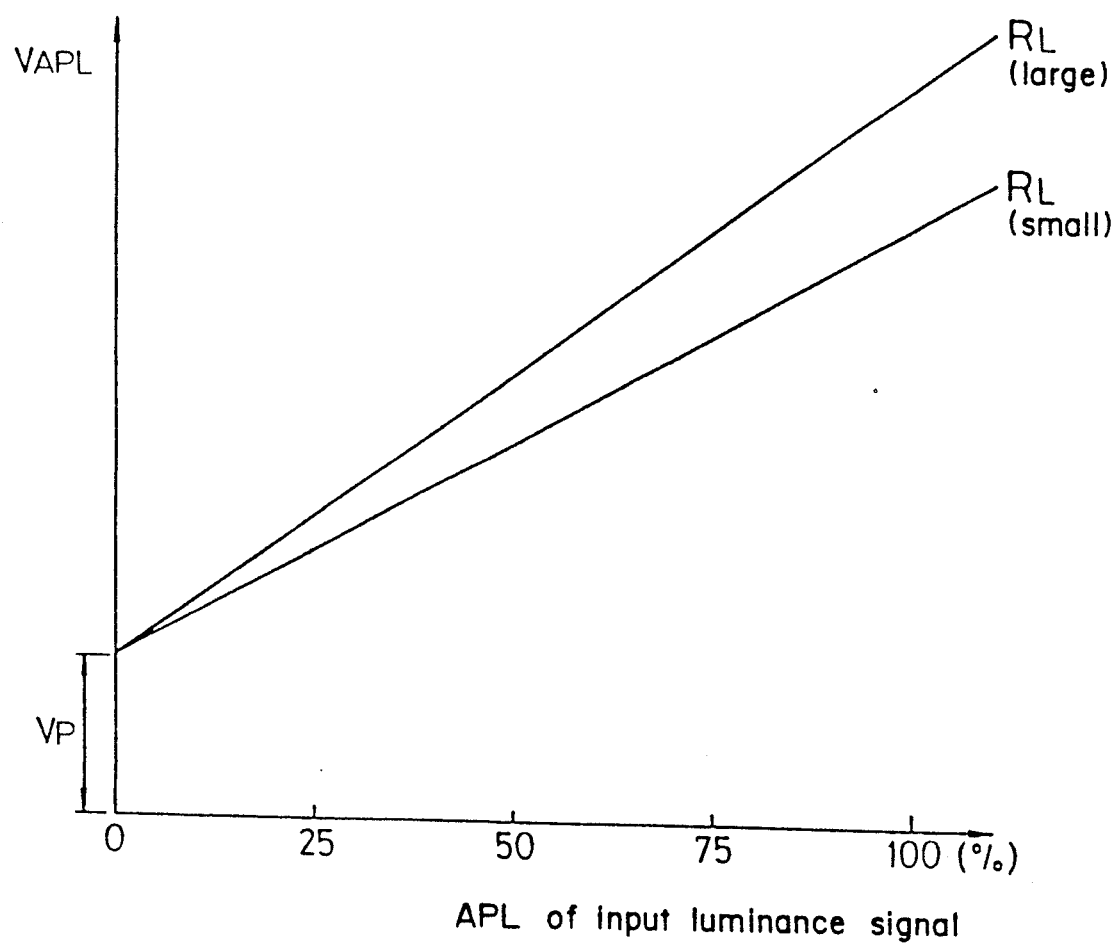
FIG. 3 is an average picture level detecting characteristics chart.
Figure 4:
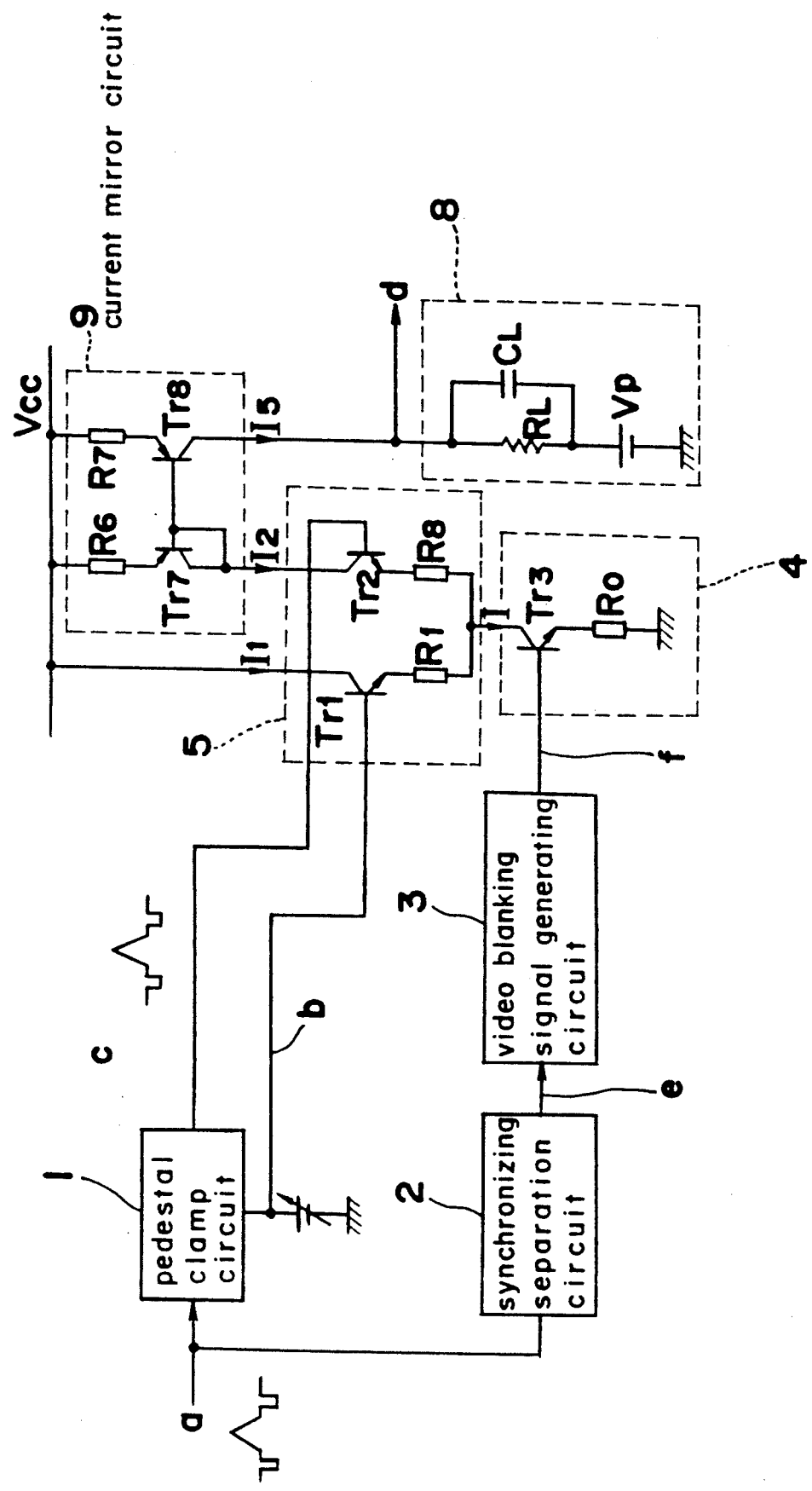
FIG. 4 is a block diagram of the conventional image signal average picture level detecting apparatus.
Figure 6:
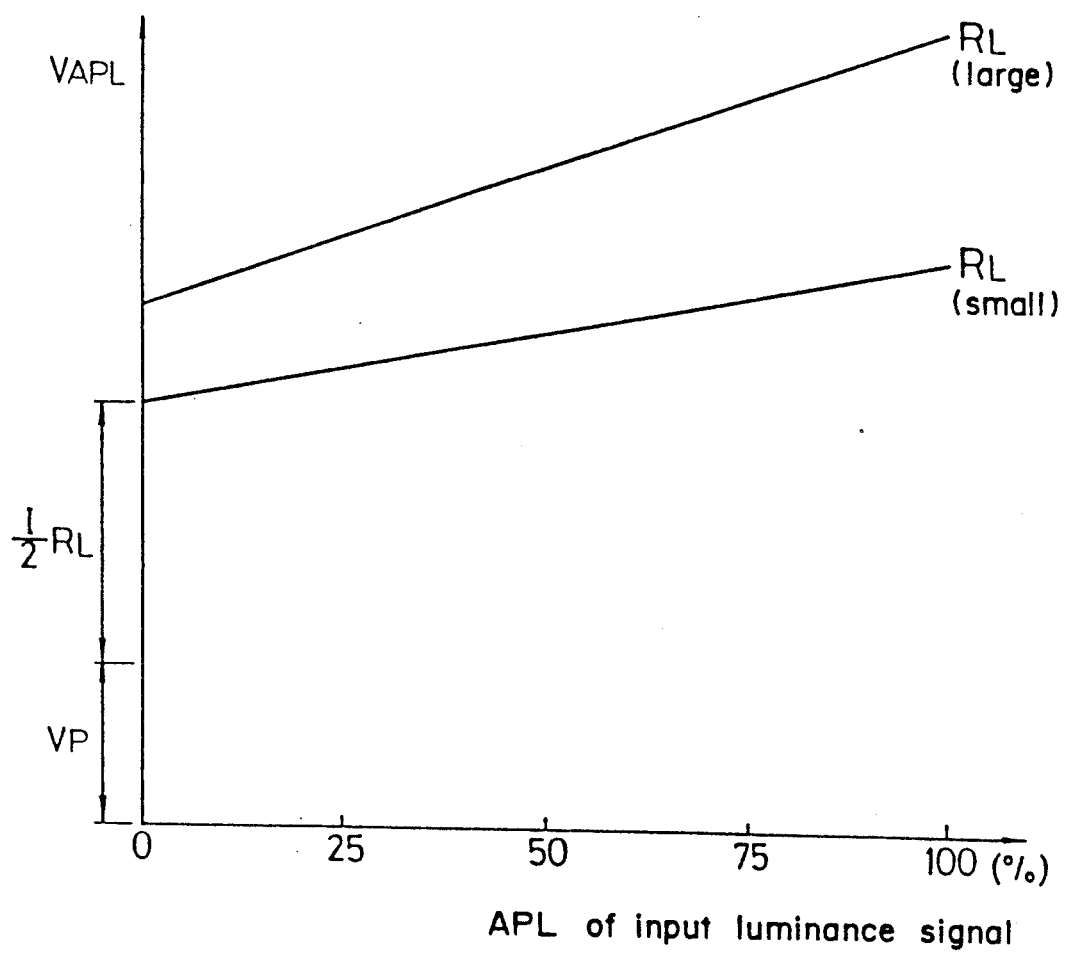
FIG. 6 is an average picture level detection characteristics chart thereof.

The operation of image signal average picture level detecting apparatus of the present invention will be described hereinafter with reference to FIG. 1, FIG. 2 and FIG. 3.

The pedestal clamping circuit 1, the generation of the constant current by Tr3, and the operation of the differential amplifying circuit 5 using Tr1 and Tr2 are the same as in the conventional embodiment. In the present invention, the first current mirror circuit 6 formed of Tr3, Tr4, R2 and R3 is connected as an active load to the collectors of Tr1 and Tr2 as shown in FIG. 1, and also, the input of the second current mirror circuit 7 formed of Tr5, Tr6, R4 and R5 is connected to the collectors of Tr4 and Tr2.

$$R2=R3=R4=R5 \tag{8}$$

Because of the characteristics of the current mirror circuits 6 and 7, approximately $$I1=I1' \text{ and } I3=I4 \tag{9}$$

Also, $$I2=I1'+I3 \tag{10}$$

From the formulas (9) and (10) and the formulas (2) and (3), $$I4=(V_{B2}-V_{B1})/R \tag{11}$$

where R1=R8=R.

As in the formula (6), the output average picture level voltage $V_{APL}$ is $$V_{APL}=V_P+R_L\int I4 dt \tag{12}$$

Substitute the formula (11) into the formula (12), and the following formula is obtained, $$V_{APL}=V_P+R_L/R \times \int (V_{B2}-V_{B1}) dt \tag{13}$$

In the present invention, the output average picture level voltage $V_{APL}$ is represented as the total of the optional direct current voltage $V_P$ and the average picture level component of the image signal of the second term, and does not include an offset voltage as in the formula (7) of the conventional embodiment. The output average picture level voltage when APL =0% ($V_{B2}-V_{B1}=0$) may be optionally set by varying $V_P$ and also, the output amplitude of the average picture level may be optionally set by varying $R_L$.

The waveforms of the various signals described above are shown in FIGS. 2a through 2g. Also, the relation of the formula (13) is shown in FIG. 3 as the relation between the average picture level of the input luminance signal and the output average picture level voltage $V_{APL}$.

As described hereinabove, in accordance with the present embodiment, the first current mirror circuit 6 is used as a load (active load) of the differential amplifying circuit 5, instead of the current mirror circuit 9 used in the conventional image signal average picture level detecting apparatus, and the output is fed into the smoothing circuit 8 by the second current mirror circuit 7, so that the direct current voltage of the output average picture level and the detection voltage amplitude may be optionally set without causing an offset voltage in the output average picture level voltage with the current flowing through the second current mirror circuit 7 being provided as zero when APL=0%.

In contrast to the above described embodiment, R4 does not have to be equal to R5. In this case, the output amplitude changes. Also, the current mirror circuits may be a 3 transistor type, a WILSON type and so on, rather than the above described 2 transistor type.

Although the video blanking signal generating circuit generates the video blanking signal "f" from the synchronous signal "e" which is separated from the input signal by the synchronous separating circuit, the video blanking signal "f" may instead be waveform shaped and generated with a fly-back pulse as the input signal in the case of the television receiver.

As is clear from the foregoing description, according to the arrangement of the present invention, by the provisions of a synchronous separating circuit, a video blanking signal generating circuit, an image period constant current generating circuit, a pedestal clamping circuit, a current supply, a differential amplifying circuit, a first current mirror circuit, a second current mirror circuit, and a smoothing circuit, the output voltage when the average picture level of the image signal is zero may be optionally selected, and the output amplitude may be also set optionally, thus realizing an image signal average picture level detecting apparatus having significant practical advantages.

Although the present invention has been fully described by way of example with reference to the accompanying drawings, it is to be noted here that various changes and modifications will be apparent to those skilled in the art. Therefore, unless otherwise such changes and modifications depart from the scope of the present invention they should be construed as included therein.

What is claimed is:

1. An image signal average picture level detecting apparatus for detecting an average picture level of an input image luminance signal, said apparatus comprising:

a synchronous signal separating circuit for separating a synchronous signal from the input image luminance signal;

an image blanking signal circuit for generating an image blanking signal having an image period and a blanking period in accordance with the synchronous signal separated by said synchronous signal separating circuit;

an image period constant current generating circuit for generating a constant current only during the image period of the image blanking signal generated by said image blanking signal circuit;

a pedestal clamping circuit for clamping a pedestal of the input image luminance signal to a given pedestal voltage to obtain a post-clamp input image luminance signal;

a differential amplifier circuit, receiving the constant current generated by said image period constant current generating circuit, for obtaining a difference between the post-clamp input image luminance signal and the pedestal voltage;

a first current mirror circuit connected as a load to said differential amplifier circuit;

a second current mirror circuit connected to the first current mirror circuit for generating a current corresponding to an input and output of said first mirror circuit; and, a smoothing circuit for smoothing and converting the current generated by said second current mirror circuit into an output voltage denoting the average picture level of the input image luminance signal, wherein an amplitude of the output voltage in a condition where the average picture level is zero and the amplitude of the output voltage in the condition where the average picture level is other than zero are settable without adding an offset voltage error to the output voltage denoting the average picture level.

2. An apparatus as recited in claim 1, wherein said smoothing circuit includes a direct current voltage source which is settable to vary the amplitude of the output voltage of the smoothing circuit in the condition where the average picture level is zero without adding the offset voltage error to the output voltage denoting the average picture level.

3. An apparatus as recited in claim 2, wherein the smoothing circuit further includes a resistive element which is settable to vary the amplitude of the output voltage in the condition where the average picture level is other than zero, wherein the amplitude of the output voltage in the condition where the average picture level is zero remain the same as the resistive element is varied.

* * * * *